US009635741B2

(12) United States Patent
Nieuwlands

(10) Patent No.: US 9,635,741 B2
(45) Date of Patent: Apr. 25, 2017

(54) REQUESTING INFORMATION FROM LIGHTING DEVICES

(71) Applicant: PHILIPS LIGHTING HOLDING B.V., Eindhoven (NL)

(72) Inventor: Eric Johannus Hendricus Cornelis Maria Nieuwlands, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/764,640

(22) PCT Filed: Jan. 16, 2014

(86) PCT No.: PCT/IB2014/058308
§ 371 (c)(1),
(2) Date: Jul. 30, 2015

(87) PCT Pub. No.: WO2014/118663
PCT Pub. Date: Aug. 7, 2014

(65) Prior Publication Data

US 2015/0373813 A1 Dec. 24, 2015

Related U.S. Application Data

(60) Provisional application No. 61/758,822, filed on Jan. 31, 2013.

(51) Int. Cl.
*H05B 37/02* (2006.01)
*H04L 12/24* (2006.01)

(52) U.S. Cl.
CPC ................................ *H05B 37/0245* (2013.01)

(58) Field of Classification Search
None
See application file for complete search history.

(56) References Cited

U.S. PATENT DOCUMENTS 6,538,568 B2 * 3/2003 Conley, III ............ G08B 7/062 315/86
8,912,898 B2 * 12/2014 Arnold .................. G06Q 30/02 315/200 A (Continued)

FOREIGN PATENT DOCUMENTS

WO 2007017811 A2 2/2007
WO 2008084414 A1 7/2008

(Continued)

OTHER PUBLICATIONS

ANSI, Entertainment Services and Technology Association, "American National Standard E1.20—2006, Entertainment Technology RDM, Remote Device Management Over DMX512 Networks," 2006 (147 pages).

*Primary Examiner* — Dedei K Hammond
(74) *Attorney, Agent, or Firm* — Meenakshy Chakravorty

(57) ABSTRACT

A module comprises messaging logic configured to generate a same message for a plurality of destination lighting devices. The message comprises a first portion specifying the plurality of destination lighting devices, and a common second portion specifying the message as being of a type that requests lighting device information. The module also comprises a port configured to output this same message to the plurality of destination lighting devices. If one of the destination lighting devices responds to the message, the processing module receives back the response from the responding device via the port. In addition to identifying the responding one of the destination lighting devices, the response also specifies the requested information of that lighting device.

13 Claims, 3 Drawing Sheets

(56) References Cited

U.S. PATENT DOCUMENTS

| | | | | |
|---|---|---|---|---|
| 2008/0265799 | A1 | 10/2008 | Sibert | |
| 2009/0284169 | A1 | 11/2009 | Valois | |
| 2009/0315485 | A1 | 12/2009 | Verfuerth et al. | |
| 2013/0328486 | A1 * | 12/2013 | Jones | H05B 37/02 315/151 |

FOREIGN PATENT DOCUMENTS

| | | | |
|---|---|---|---|
| WO | 2012085744 | A2 | 6/2012 |
| WO | 2012085850 | A1 | 6/2012 |

* cited by examiner

REQUESTING INFORMATION FROM LIGHTING DEVICES

CROSS-REFERENCE TO PRIOR APPLICATIONS

This application is the U.S. National Phase application under 35 U.S.C. §371 of International Application No. PCT/IB2014/058308, filed on Jan. 16, 2014, which claims the benefit of U.S. Provisional Patent Application No. 61/758,822, filed on Jan. 31, 2013. These applications are hereby incorporated by reference herein.

FIELD OF THE INVENTION

The present invention relates to the transmission of messages for requesting information from lighting devices in a lighting system, e.g. to request status information such as error status, device hours or other information.

BACKGROUND

Various lighting systems exist comprising a plurality of lighting devices, each device comprising a respective light source. In such systems it may be desirable to manage the plurality of lighting devices remotely, e.g. so as to manage the devices centrally and/or in coordinated manner. For example the system may comprise sports lighting, lighting in an entertainment environment such as stage lighting, outdoor lighting for various purposes, or lighting in the office or home.

To this end, messaging protocols are known for managing a plurality of lighting devices from a suitable control module or the like. As well as potentially controlling the light sources (e.g. switching them on or off, dimming them, and/or coordinating their operation), another aspect of managing the lighting devices is the ability to collect technical information from them. Such information may for example comprise status information reflecting the operational status experienced by the devices "in the field", or information on the nature or capabilities of the devices.

One such protocol is RDM ("Remote Device Management") which may be implemented over a DMX512 network ("Digital Multiplexing using 512 pieces of information"). This is described in ANSI (American National Standards Institute) specification E1.20.

Using a traditional DMX-RDM system or the like, it is possible to remotely obtain status information such as logging information, error counts, lifetime and/or switch times from a lighting device. This requires one or more DMX-RDM commands to be sent on a per-lightsource basis, individually addressing each light source from which status information is desired. To get the status information of full installation requires commands to be sent to all of the light sources, one at a time. This is bandwidth-intensive and so interrupts the normal DMX flow, and can result in visible flickering of the light sources.

SUMMARY

According to one aspect disclosed herein, there is provided a module for transmitting messages in a system of lighting devices. The module comprises messaging logic configured to generate a same one of said messages for a plurality of destination lighting devices. The message comprises a first portion specifying the plurality of destination lighting devices, and a common second portion specifying said message as being of a type that requests lighting device information. The module also comprises a port configured to output said same message to the plurality of destination lighting devices. If one of the destination lighting devices responds to the message, the messaging logic receives a response back from the responding device via the port. In addition to identifying the responding one of the destination lighting devices, the response also specifies the requested information of that lighting device.

According to another aspect disclosed herein, there is provided a lighting device comprising a port configured to receive, from a module of a lighting system, a message transmitted to a plurality of lighting devices including said lighting device. The message comprises a first portion specifying the plurality of lighting devices, and a common second portion specifying at least a type of the message. The lighting device also comprises messaging logic configured to identify said lighting device as being specified amongst the plurality of lighting devices specified in the first portion, to identify the type of message specified in the second portion, and if required by the identified type to respond back to said module with a response identifying said lighting device and specifying requested lighting device information.

According to a further aspect, there may be provided a system comprising the module and a plurality of lighting devices having the features outlined above.

Because the same command message is broadcast to multiple target devices, the process of querying those devices need not incur the bandwidth of transmitting individual commands one at time to each respective device. Broadcasting one common command to multiple devices may appear unwise in a system such as a DMX-RDM system, as it may potentially invoke responses from two or more devices at once, and such responses may collide when transmitted over the same medium (e.g. bus) at the same time. For example the ANSI spec E1.20 states that after discovery, communications should operate in a collision free environment, which appears to imply that one should never solicit a response from two devices at once. However, it is recognized herein that in a lighting system, a command message need not always invoke a response from every lighting device to which it is addressed. In fact, it may be relatively often that no response is warranted, or that a response from only one device is warranted. Thus even if a command is broadcast to multiple devices, there need not be a collision; or at least, the chance of invoking two colliding responses may be tolerably small.

An example would be a command which requests a report of any error occurring at a lighting device. In a modern lighting system errors may be relatively rare, and so the chance of receiving an error back from more than one device would be tolerably low. A similar observation may be made for a command requesting a report of any other infrequently occurring status.

Hence in embodiments, the lighting device information requested by the type of message specified in the second portion may comprises status information reflecting an operational status experienced by each destination device respectively, the response specifying the requested status information reflecting the operational status experienced by the responding lighting device.

The lighting device information requested by the type of message specified in the second portion may comprise an error status.

In other embodiments, the message may request a report of any other property of a lighting device, preferably that is not expected too often to warrant more responses than the communication medium can handle (how often that is may depend on the application in question). For example the command message could search the devices for a particular rarely-occurring device capability or feature.

In embodiments the second portion of said message may specify a condition, and the type of message specified in the second portion may cause each destination lighting device to respond only if the condition is found at the respective destination lighting device.

In embodiments the messaging logic of the lighting device may be configured to determine the condition from the type of messaged identified from the second portion, to assess the condition at the lighting device, and to respond only if the condition is found.

The condition may comprise an error condition and said type may cause each of the plurality of destination lighting devices to respond only if the error condition is found at the respective destination lighting device.

Thus in embodiments, the decision as to the relevance of the information may be distributed amongst the lighting devices. Whereas previously a controller might have collected individual responses from all devices and then decided centrally which responses were relevant or required action, according to embodiments of the present invention a certain amount of extra intelligence may displaced out to the lighting device nodes. For example instead of receiving back reports of number of burning hours from all devices and then deciding centrally which warrant attention, the controller can instruct each device to report back if it has been burning more than a certain number of hours, else do not respond. Thus the burden on the controller as well as on the network medium (e.g. bus) may be reduced.

In further embodiments, if more than one response is invoked, which may cause a collision on the medium (e.g. bus), then in embodiments the module may subsequently narrow its search. So in embodiments, the messaging logic of said module may be configured so as, if more than one of the destination lighting devices responds, to resend the message with a reduced number of destination lighting devices specified in the first portion.

In yet further embodiments, each of the lighting devices of said system may have an associated identifier identifying it within the system, and the first portion may specify a plurality of said identifiers, in which case the second portion is common to the plurality of identifiers specified in the second portion, and the identification received in the response may comprise the identifier of the responding lighting device.

The first portion may specify the plurality of identifiers in terms of a range, in which case the first portion may comprise an upper and lower bound of said range.

The message may be transmitted to the plurality of lighting devices in parallel.

In some embodiments, the responding device may be one of a plurality of sub devices of a larger, parent device, and the identification of the responding device received in said response may comprise an identifier of the parent device and a sub identifier of the sub device.

In some embodiments, the system may be associated with a scheme of long identifiers for identifying lighting devices; the messaging logic may be further configured to perform an initial discovery process comprising transmitting a discovery message addressed to a range of said long identifiers and receiving back responses comprising the long identifiers of the lighting devices present in said system, including at least said plurality of destination lighting devices; the messaging logic may also be configured to allocate short identifiers to the lighting devices of said system following the discovery process; and said first portion may use ones of the short identifiers to specify the destination devices, and said response may use one of the short identifiers to identify the responding device.

According to another aspect disclosed herein, there may be provided a computer program product for transmitting messages to lighting devices, comprising code embodied on a computer-readable medium and configured so as when executed on a processor to perform operations in accordance with any of the above features.

According to another aspect disclosed herein, there may be provided a computer program product for use in operating a lighting device, comprising code embodied on a computer-readable medium and configured so as when executed on a processor to perform operations in accordance with any of the above features.

BRIEF DESCRIPTION OF THE DRAWINGS

For a better understanding of embodiments of the present invention and to show how they may be put into effect, reference is may by way of example to the accompanying drawings in which.

DETAILED DESCRIPTION OF PREFERRED EMBODIMENTS

According to embodiments of the present invention, there is provided a simpler, faster way to check for errors or other status information from the light sources of a DMX installation or the like.

In embodiments the invention may use a similar algorithm for error detection as is used for the DMX initial discovery process, by broadcasting a 'Check ErrorLevels' command to a group of light sources in a particular address range.

This takes advantage of the observation that it is rare for a modern light source to be in an error condition. Usually, periodic checking of a light installation will determine that none of the light sources is in an error condition. Therefore it is efficient to broadcast a 'respond if you are in error, else do not respond' command to multiple light sources (e.g. those with short IDs in a range specified in the command), since most of the time none of the light sources will respond.

In preferred embodiments, there may be different error levels. For instance, if the temperature of a light source is 60, 70 or 80 degrees, then its error level will be Level 1, Level 2 or Level 3 respectively. This allows the controller to broadcast to a group of light sources, e.g. "respond if you are at Level 3, else do not respond".

Any of the group's light sources at Level 3 will respond with an identifier of itself, e.g. its short ID. If just one light source responds, the controller can then request more detailed info from that light source. If multiple light sources respond (causing a CRC error), the controller will use a smaller range of addresses to broadcast to a sub-group of the light sources. This will be repeated until just one light source responds, using a binary search method like in the DMX initial discovery phase, but for error checking instead of discovery.

Advantageously, this low-cost approach can be implemented easily in DMX systems due to its similarity to the DMX discovery process. Most of the time it replaces multiple transmitted commands—i.e. at least one per light source—with a single command transmitted to multiple light sources, thereby using less bandwidth and minimizing interruption of the normal DMX flow. It can also be used to do a quick check without knowledge of commissioning: broadcast the command to all light sources (e.g. using the max range of short IDs), and if none of the light sources responds then there are no errors—no information of the system is required.

One exemplary application of the present invention is in high-end sports lighting, but the invention can also be used for any other application such as stage lighting, studio lighting, lighting for events, outdoor lighting, or lighting in the office or home.

Exemplary embodiments will now be discussed in more detail with reference to FIG. 1.

Figure 1:
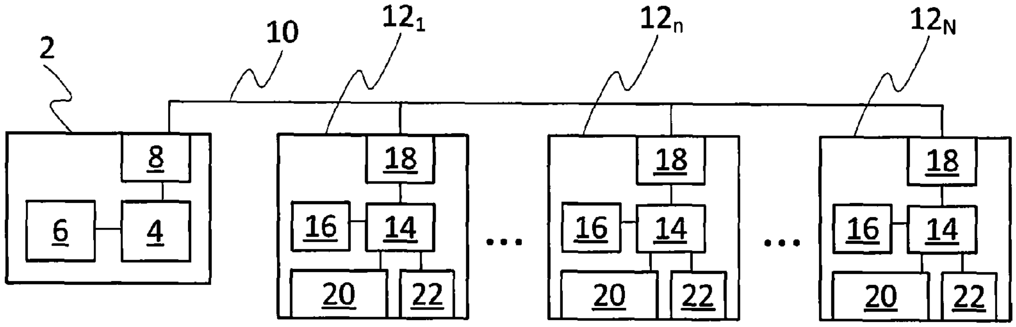
FIG. 1 is a schematic block diagram of a lighting system.

FIG. 1 is a schematic block diagram of a lighting system comprising a control module 2 to act as a controller, and a plurality of lighting devices $\mathbf{12}_1 \ldots \mathbf{12}_n \ldots \mathbf{12}_N$ arranged to act under the influence of the control module 2. Each lighting device 12 comprises a respective light source 20, typically lamp, as well as any other associated elements of the fixture such as socket and housing. Optionally, one or more of the lighting devices 12 may also comprise a respective sensor 22, e.g. light sensor and/or presence sensor.

In embodiments each lighting device 12 may comprise a single light source 22 (typically lamp), i.e. one light source per lighting device 12. Alternatively the possibility that multiple light sources are treated as one indivisible device (without the ability to individually addresses them) is not excluded, though this may be less preferred as it may mean information on individual sources is limited, e.g. it may not be distinguishable from the information reported in a response message which of multiple lamps is the source of an error status.

The control module 2 comprises a port 8 and each of the lighting devices 12 comprises a respective port 18. The ports 8 and 18 are coupled together via a communication medium 10 and are thereby arranged for the control module 2 to transmit messages (which may be referred to herein as commands) out to the lighting devices 12, and for the lighting devices 12 to transmit back responses to the control module 2. Thus the control module 2 and lighting devices 12 form nodes of a lighting network implemented over the communication medium 10.

The medium 10 may comprise a wired medium such as a bus via which the ports 8, 18 are connected together, e.g. in a daisy chain topology. Alternatively the ports 8, 18 may comprise wireless transceivers for conveying the commands and responses via a wireless medium. The following will be described in terms of a wired medium such the bus of a wired network, e.g. a DMX512 network, but it will be understood that other implementations such a wireless medium are also possible.

The control module 2 comprises control logic coupled to the port 8. The control logic comprises at least messaging logic for transmitting the commands to lighting devices 12 via the port 8 and the relevant communication medium 10 (e.g. DMX bus), and receiving back the responses from lighting devices 12 via the port 8 and the bus 10. The control logic is implemented using a processor 4 having one or more execution units, and a non-volatile computer-readable storage unit in the form of a memory 6 comprising one or more storage media such as a magnetic medium (e.g. hard drive) or electronic medium (e.g. “flash” memory or other EEPROM). The memory 6 is coupled to the processor 4 and stores control code arranged to be executed on the processor 4, configured so as when executed to implement the following functionality of the control module 2. Alternatively some or all of this functionality may be implemented in dedicated hardware circuitry.

Each lighting device 12 also comprises respective logic coupled to the port 8, light source e 20 and optionally sensor 22. This logic comprises at least messaging logic for receiving the commands from the control module 2 via the port 18 and bus 10, processing the commands at the respective lighting device 12, and transmitting any response required as a result of this processing back to the control module 2 via the port 18 and bus 10. The logic in the lighting device may also take the form of a processor 14 having one or more execution units, and a non-volatile computer-readable storage unit in the form of a memory 16 comprising one or more storage media such as a magnetic medium (e.g. hard drive) or electronic medium (e.g. “flash” memory or other EEPROM). The memory 16 is coupled to the processor 14 and stores code arranged to be executed on the processor 14, configured so as when executed to implement the following functionality of each respective lighting device 12. Alternatively some or all of this functionality may be implemented in dedicated hardware circuitry.

The control module 2 and lighting devices 12 are arranged to communicate the command messages and responses according to a messaging protocol. In embodiments the command module 2 is arranged as a master of the lighting system and the lighting devices 12 are arranged as slaves to the master control module 2. In embodiments the system is arranged to function as a polled system, meaning that only the control module 2 can initiate communication and each of the slave lighting devices 12 can only send a message in responds to a command from the control module 2.

Each node, i.e. each of the control module 2 and the lighting devices 12, is associated with a respective identity identifying it within the lighting system. The identify may for example be stored in a part of the memory 6, 16 of the respective device or module, in a register of the respective device or module, and/or in a set of fuse latches of the respective device or module.

The identity may comprise a long identifier which may be a unique identifier (UID) that uniquely identifies the device or module amongst all other devices and modules that could potentially be members of the network, i.e. all devices that comply with the relevant standard. I.e. the long identifier is a globally unique identifier. The long identifier may comprise a manufacturer ID identifying the manufacturer of the device or module, and a device ID identifying the device or module amongst all others manufactured by that manufacturer according to the relevant standard. For example ANSI E1.20 dictates a UID comprising a 16-bit ESTA (Entertainment Services and Technology Association) manufacturer ID and a 32-bit manufacturer ID.

Alternatively or additionally, the identity may comprise a short identifier which may only be unique within the particular lighting system as installed. I.e. the short identifier is a locally unique identifier.

Figure 2:
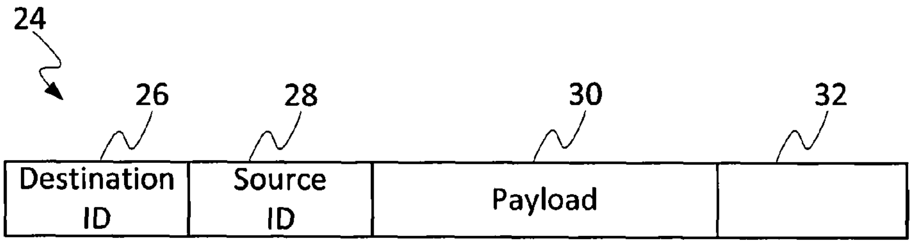
FIG. 2 is a schematic representation of a message format.

A message format for communicating both commands and responses over the bus 10 (or other medium) is shown schematically in FIG. 2.

The format of the message 24 comprises an address portion comprising a destination ID portion 26 for carrying an identifier of a destination of the message (an identifier of a destination lighting device 12 in the case of a command and an identifier of the control module 2 in the case of a response), and a source ID portion for carrying an identifier of the source of the message (an identifier of the control module 2 in the case of a command and an identifier of the responding lighting device 12 in the case of a response). Depending on the protocol and/or the situation, the identifier used in either the source and/or destination portions 26, 28 may comprise either a long or a short identifier.

In embodiments, some of the lighting devices 12 may be sub devices of a larger parent device, in which case the parent device may be associated with a parent identifier and the sub device may be associated with a sub identifier identifying it within the parent device. One example would be an individual dimmer of a dimmer rack. In such cases the identity of the device being the destination of a command and the source of a response is the identity of the sub device, and the identifier used to identify the destination of a command and the source of a response is the combination of identifier and sub identifier.

That is, the identifier addresses the ultimate destination and source of the command and response messages respectively. Any identifier involved in addressing the source and destination in question is considered part of the relevant identification.

The message format also comprises a payload portion 30. In the case of a command message from control module 2 to lighting device 12, the payload 30 specifies the nature of the command, i.e. defines what is requested of the destination lighting device 12. In the case of a response message, the payload 30 specifies the content of the response, i.e. comprises an indication the information that is requested. The message format may also comprise an additional portion 32 comprising data concerning the transmission of the message, e.g. message count and/or checksum.

In an example implementation, the payload 30 may comprise the Command Class (CC), Parameter Identifier (PID) and Parameter Data (PD) fields of the DMX-RDM protocol according to ANSI specification E1.20, or variants thereof.

In embodiments, prior to sending out command messages requesting status information or the like from the lighting devices 12, the control module 2 is configured to perform a discovery procedure to discover which devices are present in the system—i.e. which are available on the network, being connected to the bus 10 or other such communication medium. The discovery process may be performed upon installation, either upon initial installation or when one or more new devices 12 are installed. Alternatively or additionally, the discovery process may be performed at intervals, e.g. periodically, to check for new devices 12 subsequently installed into the system.

To perform the discovery process, the control module 2 broadcasts a discovery message on the network bus 10 (or other medium) to a plurality of lighting devices 12 within a certain address range, i.e. range of identifiers. The discovery message may take the same format 24 discussed above, with the range of destination identifiers specified in the destination identifier portion 26 (and the control module's identifier in the source portion 28). The payload 30 of the discovery message defines the message as being a discovery message, i.e. a message which invokes any receiving lighting device 12 to declare its presence on the bus 10 (or more generally the on relevant communication medium for the system).

For example, to begin the discovery process the control module 2 may broadcast a discovery message to all devices 12 by inserting a special "all devices" identifier in the destination portion 26. Alternatively the first discovery message could begin by specifying a range of destination identifiers of interest.

Assuming that multiple destination lighting devices 12 are present and so do receive this initial discovery message, then each of these lighting devices 12 responds with a respective response message. The discovery response message comprises the control module's identifier in the destination identifier portion 26 and the responding devices' own respective identifier (including any sub identifier) in the source identifier portion 28. The discovery response message does not carry any other information.

In a network for managing a lighting system, such as in a DMX-RDM network, the bus 10 may not be capable of carrying multiple messages at once, and/or the control module 2 may not be capable of receiving or processing more than one response arriving back at once. Thus when multiple devices 12 respond to the discovery message at once (the responses at least overlap in time), then these response messages will collide. This means the control module 2 will not be able to receive the information in the responses. However, the control module 2 is configured to detect the fact of there having been a collision. For instance the control module 2 detects a signal on the bus 10, but due to the collision the detected signal does not meet an error check such as a CRC check or other checksum.

Thus as a result of the initial discovery message, the control module 2 knows there are multiple devices in the probed range, but needs to continue probing further to complete the discovery. Therefore the control module 2 continues by sending another discovery message with a reduced range of destination identifiers in the destination identifier portion 26. If in response it detects another collision, the control module narrows the searched range again and sends yet another discovery message until it detects either a single response or no response. If there is no signal received back in response on the bus 10, the control module 2 tries addressing another identifier or range within the previous level of search. If it receives a single response with no collision, the control module 2 has discovered one of the devices 12 and is able to determine from the source identifier portion 28 the address of a device 12 known to be present on the network.

The control module 2 then continues to search for other ones of the devices 12 by muting the discovered device and repeating the above process from previous level, i.e. by re-widening the searched identifier range and then searching back through the range for other, as-yet undiscovered and un-muted devices. For instance the search may proceed according to a binary tree search, and example of which is set out in section 7 of ANSI specification E1.20. Once all devices are discovered, they are unmuted again and the system is ready for use.

In embodiments the discovery process uses only the scheme of long identifiers (e.g. globally unique identifiers) in the identification. So for the outgoing discovery message the destination identifier portion may 26 comprise a range of the long identifiers and for the discovery responses the source identifier portion 28 may comprise the long identifier of the responding device 12, and no other kind of identifier is necessarily involved. Also for the outgoing discovery message the source portion 28 may comprise the long identifier of the control module 2 and for the discovery response the destination portion 26 may comprise the long identifier of the control module 2, and no other kind of identifier may be involved.

In some embodiments subsequent messages, such as the commands requesting information from lighting devices and the corresponding responses, may also use the long identifiers for the source and destination identifiers. In other embodiments of the present invention, following the discovery process, the control module 2 may allocate respective short identifiers (e.g. locally unique identifiers) to the discovered lighting devices 12. A short identifier may also be allocated to the control module 2 itself. In this case subsequent messages such as the commands and/or corresponding responses may use only the short identifiers in the source and/or destination portions 26, 28. In another alternative, the subsequent messages may continue to use the long identifiers in the source and/or destination portions 26, 28, but these long identifiers may be mapped to the short identifiers by a lower protocol layer at the control module 2 and/or lighting devices 12, so that at a higher layer the control module 2 and/or lighting device 12 software address and process the messages in terms of their short identifiers. Thus once discovery has been performed, the long identifiers may become hidden from the software layer responsible for managing the lighting system.

By whatever addressing method is used, embodiments of the present invention provide a scheme in which a single instance of a command message requesting lighting device information can be transmitted to multiple lighting devices in parallel. That is, rather than sending an individual respective instance of the command message to each lighting device 12 individually, waiting for the command-response cycle for one device 12 to be completed before sending a command to the next respective lighting device 12 and so forth, the control module 2 places one instance of the command message onto the bus 10 addressed to a plurality of destination lighting devices 12 at once, preferably addressed in terms of a range of destination identifiers. In this sense the command message may be said to be broadcast to the plurality of destination devices 12, soliciting the requested information from each destination device.

According to preferred embodiments, the scheme may exploit the fact that a mechanism for broadcasting messages already exists for the purpose of discovery, to use this mechanism for a new purpose of requesting additional information after devices have been discovered. In particularly preferred embodiments the mechanism is used to collect the error status of lighting devices 12.

Figure 3:
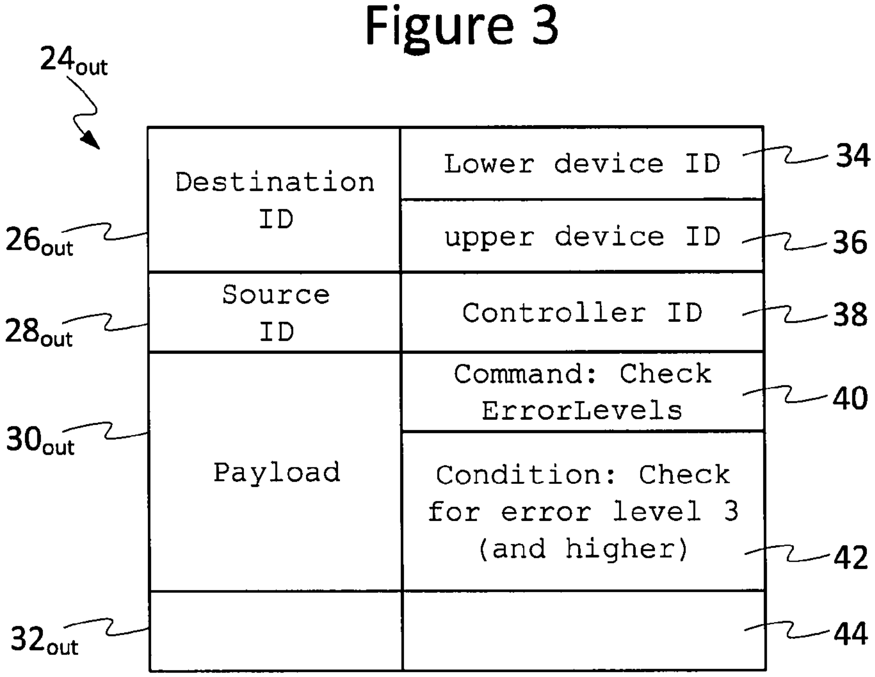
FIG. 3 is a schematic representation of an outgoing message.

FIG. 3 illustrates schematically an instance of an outgoing command message $\mathbf{24}_{out}$ for requesting information from a plurality of lighting devices 12.

The destination ID portion $\mathbf{26}_{out}$ of the command message $\mathbf{24}_{out}$ comprises a definition of a plurality of (already discovered) destination lighting devices 12 on the network. Preferably these are specified in terms of a range of destination identifiers, the destination ID portion $\mathbf{26}_{out}$ comprising a lower bound 34 of the range and an upper bound 36 of the range. The source ID portion $\mathbf{28}_{out}$ of the command message $\mathbf{24}_{out}$ comprises an identifier 38 of the control module 2 itself.

Further, the payload portion $\mathbf{30}_{out}$ of the command message $\mathbf{24}_{out}$ comprises a definition 40, 42 of the nature of the command, i.e. it specifies that the command is of a type that requests information from whichever lighting device 12 receives that command, and what information that type of command requests.

The command message $\mathbf{24}_{out}$ may also comprise and additional portion $\mathbf{32}_{out}$ comprising data 44 concerning the transmission of the message, e.g. message count, message count and/or checksum.

When the outbound message $\mathbf{24}_{out}$ is transmitted onto the bus 10 by the control module 2, at least the portion $\mathbf{26}_{out}$ addressing the destination identifiers is made visible to any lighting device connected on that same bus 10 (or more generally network medium). Each device 12 is configured to process the destination address portion $\mathbf{26}_{out}$ and identify whether it is itself specified in the addressed range 34, 36 of destination identifiers. If so the respective lighting device processes the definition 40,42 specified in the payload $\mathbf{30}_{out}$ and acts on it in the manner dictated by the type of command specified in that payload $\mathbf{30}_{out}$. This involves responding back to the control module 2 over the bus 10 with any information requested by that type.

Figure 4:
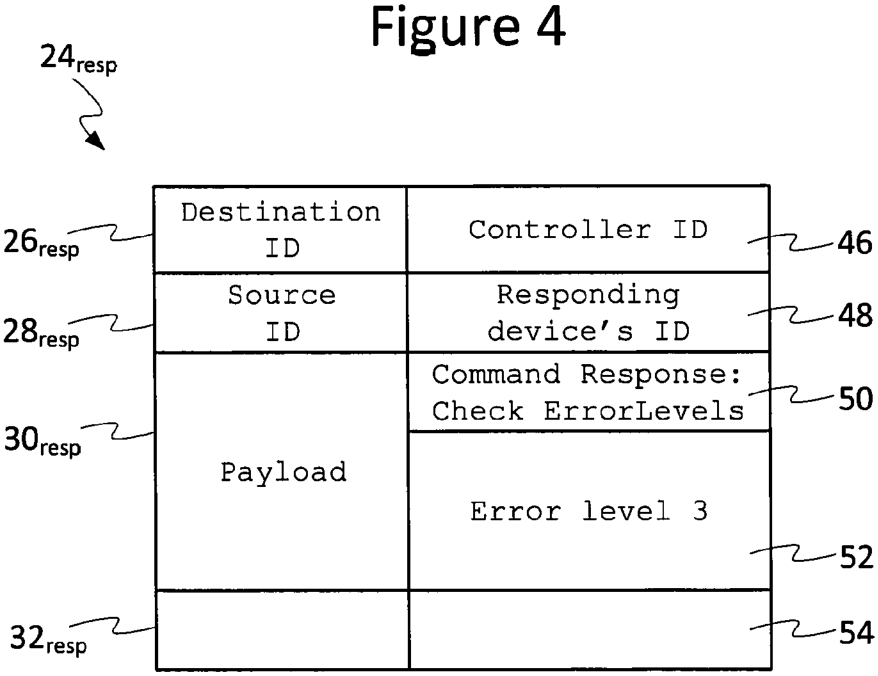
FIG. 4 is a schematic representation of a response message.

FIG. 4 illustrates schematically an instance of a response message $\mathbf{24}_{resp}$ as transmitted back from a responding lighting device 12 to the control module 2.

The destination ID portion $\mathbf{26}_{resp}$ of the response message $\mathbf{24}_{resp}$ comprises the identifier of the control module 2, and the source ID portion comprises the identifier of the responding lighting device 12 (including any sub ID). The payload portion $\mathbf{30}_{resp}$ of the response message $\mathbf{24}_{resp}$ comprises a definition 50 specifying that the message is a response to the particular type of command, as well as an indication 52 of the requested information.

The response message $\mathbf{24}_{resp}$ may also comprise an additional portion $\mathbf{32}_{resp}$ comprising data 54 concerning the transmission of the message, e.g. message count, message count and/or checksum.

When the response message $\mathbf{24}_{resp}$ is transmitted onto the bus 10 from a responding one of the lighting devices 12, the control module 2 recognizes its own identifier in the destination ID portion $\mathbf{26}_{resp}$ and accordingly processes the payload $\mathbf{30}_{resp}$ to extract the requested information.

The request is for information about the lighting device receiving the message, other than for just an identifier or address of than lighting device 12 which has already been determined on the discovery process. Preferably the requested information comprises status information, i.e. concerning a posteriori experience of the device resulting from its operation rather than information concerning an intrinsic or pre-configured a priori feature of the device. In particularly preferred embodiments the requested information is error status information.

Further, the payload $\mathbf{30}_{out}$ of the command message $\mathbf{24}_{out}$ may define not only the fact that the command is a request for information and what kind of information is requested, but also a condition associated with the request. That is, the command specifies that any recipient lighting device 12 should respond on condition that the condition is found to be met at the respective lighting device 12, else do not respond. Each lighting device 12 comprises logic for processing the condition and acting accordingly.

The specifying of the condition by the command $\mathbf{24}_{out}$ could be implicit in the type of message specified in the definition 40, understood by each receiving lighting device 12 to be associated with that type of message; or could be another part 42 of the payload $\mathbf{30}_{out}$ explicitly transmitting the condition to each of the recipient lighting devices 12.

In particularly preferred embodiments the command $\mathbf{24}_{out}$ is a conditional request for an error status from each recipient device 12.

In embodiments, the condition could be whether or not there is an error (i.e. yes/no determination). For example the condition may be whether the lighting device's light source (e.g. lamp) has burned out or otherwise failed. In this case any lighting device 12 that receives the command $\mathbf{24}_{out}$ (i.e. is a specified destination of the command) responds with an error report only if, upon receiving the command, the device 12 determines that the hard error condition is found at that device, e.g. only if its lamp has failed. Otherwise it stays silent.

Alternatively, the condition could be whether a certain level or degree of error is found at the lighting device 12, so that the device 12 responds if its level or degree of error is equal to or worse than that level, but not otherwise. For instance, there may be three (or at least three) error levels associated with each lighting device 12, Level 1, Level 2 and Level 3. E.g. Level 1 may be determined at the respective lighting device 12 if its operating temperature exceeds 60 degrees Celsius, Level 2 if the operating temperature exceeds 70 degrees, and Level 3 if it exceeds 80 degrees. Further error levels could also be defined in similar increments. The condition may for example be that the error Level is 3 (or is three or higher). In this case any lighting device 12 that receives the command $\mathbf{24}_{out}$ (i.e. is a specified destination of the command) responds with an error report only if, upon receiving the command, the device 12 determines that is at error Level 3 (or higher), but otherwise stays silent.

As shown in FIG. 3, a conditional error status command of this kind may be specified in a portion of the payload $\mathbf{30}_{out}$ which defines the nature of the command $\mathbf{24}_{out}$, and by way of example is given the name "Check ErrorLevels". This may for example be implemented in the command class (CC) and parameter ID (PID) fields of a DMX-RDM command, with the CC field set to "GET_COMMAND" and with the PID set to one of the PIDs reserved for manufacturer specific parameters. The triggering error level may be specified in the portion 42 of the outbound command payload $\mathbf{30}_{out}$, e.g. the parameter data (PD) field of a DMX-RDM command. Alternatively it could be implicit in the meaning of the "Check ErrorLevels" command, in which case the portion 52 is not necessarily required.

Figure 5:
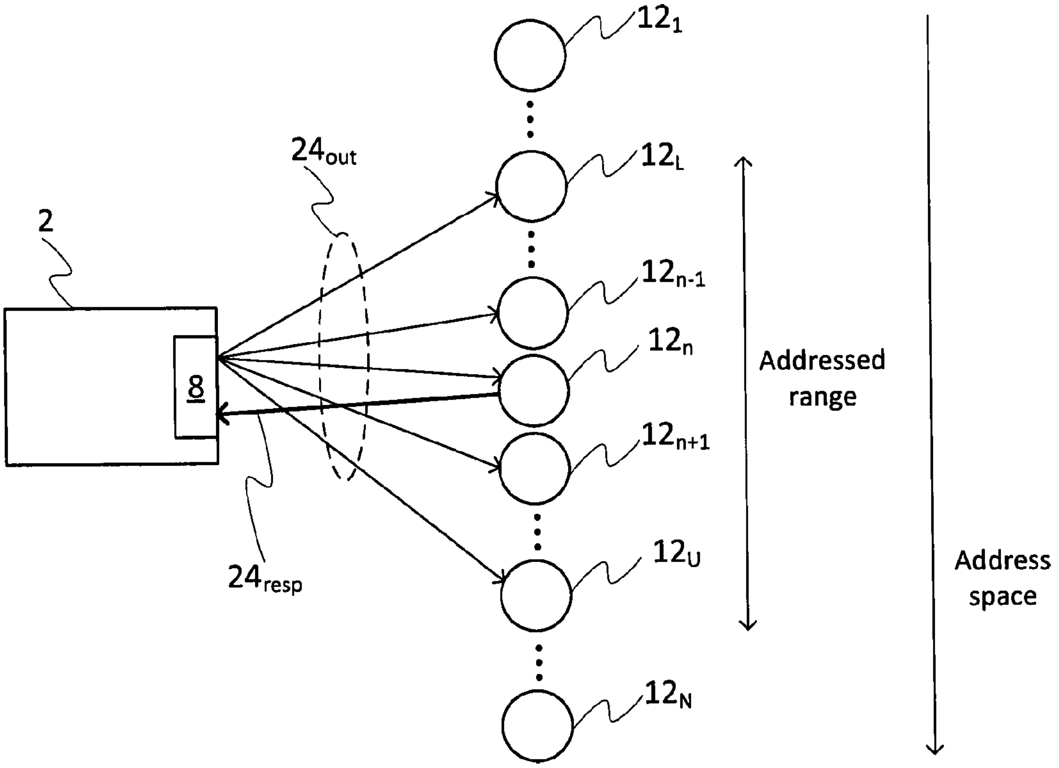
FIG. 5 is another schematic diagram of the lighting system.

The process of issuing a conditional command to multiple lighting devices is illustrated schematically in FIG. 5.

In the discovery process, the control module 2 has discovered that there are N lighting devices $\mathbf{12}_1 \ldots \mathbf{12}_N$ on the network. From those it wishes to query the error status of a group of devices $\mathbf{12}_L \ldots \mathbf{12}_U$ with IDs between a lower bound L and upper bound U. It therefore generates a command message $\mathbf{24}_{out}$ with the range U to L specified in the destination ID portion $\mathbf{26}_{out}$, and outputs this message onto the communication medium 10 (e.g. bus). Each of the lighting devices $\mathbf{12}_L \ldots \mathbf{12}_U$ specified in this range detect as much based on the destination ID portion $\mathbf{26}_{out}$ received over the bus or other communication medium 10, and are thus invoked to process the payload $\mathbf{30}_{out}$ to identify the nature of the request and any condition associated with it. If the command comprises a request for error status on condition that the receiving device 12 is at error Level 3 (or higher), each lighting device 12 compares its own error level against this condition. If the condition is met or exceeded (i.e. at that error level or worse) at one of the lightening devices 12, e.g. the device $\mathbf{12}_n$ shown in FIG. 5, then it formulates a respective response $\mathbf{24}_{resp}$ indicating its respective error level and ID (including any sub ID), which it outputs back onto the bus or medium 10.

The fact that only one instance of the message $\mathbf{24}_{out}$ need be broadcast onto the bus or other communication medium 10 means that the incurred bandwidth is reduced relative to the case where individual instances of the message are sent to each individual lighting device 12 in turn.

It is possible that two or more of the addressed lighting devices $\mathbf{12}_L \ldots \mathbf{12}_U$ responds to this same message at once. However, as mentioned, the occurrence of an error in a modern lighting system is rare compared to the typical interval between status checks. Thus usually there will either be no response or a response from only one of the target devices, e.g. $\mathbf{12}_n$, and a collision between two responses will be relatively infrequent. If this does happen, the control unit 2 is configured to detect the collision on the bus or other medium 10, e.g. detecting a checksum error on the bus 10. In response to detecting a collision, the control unit 2 then reduces the addressed range and tries again. For example it could split the range in two and send two separate messages $\mathbf{24}_{out}$, e.g. one addressed to the range L to L+½(U−L) and another addressed to the range L+½(U−L)+1 to U. If it still detects a collision in one or both of these ranges, it may split the ranges further and continue trying until one or more non-colliding responses are received.

When a response is successfully received back, the control unit 2 processes the returned information and source ID to determine the status of the identified device. Based on the returned information and device ID, the control unit 2 may generate an alert to a user, and/or may use this information in subsequent control of one or more of the lighting devices 12. For example it may it may automatically turn off or reduce the power to a device 12 with an overheating light source 20.

It will be appreciated that the above embodiments have been described only by way of example.

Other status information that could be requested by a message $\mathbf{24}_{out}$ in accordance with other embodiments of the invention may comprise for example: life time of the device 12 to date (e.g. number of hours of operation the device has been in use), life time of the respective light source 20 (e.g. lamp) to date (e.g. number of hours lamp has been on), or a number of lamp strikes of the respective light source 20 (incremented each time a lamp is struck or switched on). Other requested status information may comprise an indication of whether the error status is at an advisory, warning or error level. Other requested status information may comprise: an explicit indication of operating temperature e.g. in a unit of temperature such as degrees C., an indication of an intensity of the respective light source 20, and indication of a power state of the respective light source 20, pan and/or tilt data, a reading or other status from the respective sensor 22 if present, a real time clock reading of the device 12, or a result of a built-in self-test routine of the device 12.

Other information regarding intrinsic or preconfigured parameters of the devices 12 that could be requested by a message $\mathbf{24}_{out}$ in yet further embodiments of the invention may comprise for example: information regarding the RDM capabilities of the device 12, version of RDM supported by the device, software version ID, model ID, footprint, product category, sensor count, functionality of residual current detectors (RCD) or ground fault interrupt (GFI), device model description, whether device is set to factory defaults, language capabilities, or pre-recorded presets.

Further, while the above has been described by way of example in relation to DMX-RDM, the applicability of the invention is not limited to DMX-RDM or any particular DMX-RDM specification such as E1.20. The invention may be suitable for use in relation to any lighting system in which it may be desired to query a plurality of lighting devices of any kind. For example in other embodiments the network is not limited to being connected via a wired bus 10 or any particular network topology. In other embodiments the ports 8, 18 may comprise wireless transceivers connecting the control module 2 and lighting devices 12 together via wireless medium 10, in which case the common command message $24_{out}$ may be broadcast to the multiple lighting devices, e.g. $12_L$ . . . $12_U$, wirelessly. The response(s) $24_{resp}$ may also be received back wirelessly.

Further, embodiments above have been described in terms of using a scheme of long identifiers in the discovery process and a scheme of short identifiers in the subsequent process of exchanging commands and responses. However, the invention need not be limited in this respect, and in other embodiments the long identifiers could continue to be used in after discovery to identify the source and/or destination in other messages such as the command and/or response, or indeed a different scheme of identifiers could be used.

Other variations to the disclosed embodiments can be understood and effected by those skilled in the art in practicing the claimed invention, from a study of the drawings, the disclosure, and the appended claims. In the claims, the word “comprising” does not exclude other elements or steps, and the indefinite article “a” or “an” does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A module for transmitting messages in a system of lighting devices, the module comprising:

a messaging logic unit configured to generate a message for a plurality of destination lighting devices, the message comprising a first portion specifying the plurality of destination lighting devices and a common second portion specifying said message as being of a type that requests a destination lighting device to respond with lighting device information if a predetermined error condition is found at the destination lighting device and not to respond otherwise; and a port configured to broadcast said message to the plurality of destination lighting devices;

wherein the messaging logic is configured to receive via the port, if one of the destination lighting devices responds to the message, a response which in addition to identifying the responding one of the destination lighting devices also specifies the requested information of that lighting device.

2. The module of claim 1, wherein the lighting device information requested by the type of message specified in the second portion comprises status information reflecting an operational status experienced by each destination lighting device respectively, the response specifying the requested status information reflecting the operational status experienced by the responding lighting device.

3. The module of claim 2, wherein the second portion further comprises data that specifies the predetermined error condition.

4. The module of claim 1, wherein the messaging logic unit is configured so as, if more than one of the destination lighting devices responds, to resend the message with a reduced number of destination lighting devices specified in the first portion.

5. The module of claim 1, wherein each of the destination lighting devices of said system has an associated identifier identifying it within the system, the first portion specifying a plurality of said identifiers; wherein the second portion is common to the plurality of identifiers specified in the first portion; and wherein the identification received in the response comprises the identifier of the responding lighting device.

6. The module of claim 5, wherein the first portion specifies said plurality of identifiers in terms of a range, the first portion comprising an upper and lower bound of said range.

7. The module of claim 1, wherein the message is transmitted to the plurality of destination lighting devices in parallel.

8. The module of claim 1, wherein the responding destination lighting device is one of a plurality of sub devices of a larger, parent device, and the identification of the responding destination lighting device received in said response comprises an identifier of the parent device and a sub identifier of the sub device.

9. The module of claim 1, wherein:

the system is associated with a scheme of long identifiers for identifying destination lighting devices;

the messaging logic is further configured to perform a discovery process comprising transmitting a discovery message addressed to a range of said long identifiers and receiving back responses comprising the long identifiers of the destination lighting devices present in said system, including at least said plurality of destination lighting devices;

the messaging logic is configured to allocate short identifiers to the destination lighting devices of said system following the discovery process; and said first portion uses ones of the short identifiers to specify the destination lighting devices, and said response uses one of the short identifiers to identify the responding device.

10. A lighting system comprising the apparatus of claim 1.

11. A lighting device comprising:

a port configured to receive, from a module of a lighting system, a message transmitted to a plurality of destination lighting devices including said destination lighting device, the message comprising a first portion specifying the plurality of destination lighting devices and a common second portion specifying at least a type of the message that requests a destination lighting device to respond with destination lighting device information if a predetermined error condition is found at the destination lighting device and not to respond otherwise; and a messaging logic unit configured to identify said destination lighting device as being specified amongst the plurality of destination lighting devices specified in the first portion, to identify the type of message specified in the second portion, and if required by the identified type of the message and error condition to respond to said module with a response identifying said lighting device and specifying said requested lighting device information.

12. A computer program product for transmitting messages to lighting devices, comprising code embodied on a non-transitory computer-readable medium and configured so as when executed on a processor to perform operations of:

generating a message for a plurality of destination lighting devices, the message comprising a first portion specifying the plurality of destination lighting devices and a common second portion specifying said message as being of a type that requests a destination lighting device to only respond with lighting device information if a predetermined error condition is found at the destination lighting device and not to respond otherwise; and broadcasting said message to the plurality of destination lighting devices;

if one of the destination lighting devices responds to the message, receiving back a response which in addition to identifying the responding one of the destination lighting devices also specifies the requested information of that lighting device.

13. A computer program product for use in operating a lighting device, comprising code embodied on a non-transitory computer-readable medium and configured so as when executed on a processor to perform operations of:

receiving, from a module of a lighting system, a message transmitted to a plurality of lighting devices including said lighting device, the message comprising a first portion specifying the plurality of lighting devices and a common second portion specifying at least a type of the message that requests a destination lighting device to only respond with lighting device information if a predetermined error condition is found at the destination lighting device; and identifying said lighting device as being specified amongst the plurality of lighting devices specified in the first portion;

identifying the type of message specified in the second portion; and if required by the identified type and error condition, responding to said module with a response identifying said lighting device and specifying said requested lighting device information.

* * * * *